United States Patent [19]

Ibaraki et al.

[11] Patent Number: 5,725,064
[45] Date of Patent: Mar. 10, 1998

[54] HYBRID VEHICLE WITH PUMPING LOSS REDUCING FUNCTION

[75] Inventors: Ryuji Ibaraki, Toyota; Yutaka Taga, Aichi-gun; Seitoku Kubo, Toyota, all of Japan

[73] Assignee: Toyota Jidosha Kabushiki Kaisha, Toyota, Japan

[21] Appl. No.: 651,929

[22] Filed: May 21, 1996

[30] Foreign Application Priority Data

Jun. 20, 1995 [JP] Japan .................................. 7-153092

[51] Int. Cl.$^6$ .................................................. B60L 11/02
[52] U.S. Cl. .................... 180/65.2; 364/424.026
[58] Field of Search ......................... 180/65.2, 65.3, 180/65.4, 65.6, 65.8, 69.6; 364/424.026; 318/139

[56] References Cited

U.S. PATENT DOCUMENTS 4,407,132  10/1983  Kawakatsu et al. .............. 180/65.4
4,533,011   8/1985  Heidemeyer et al. ............. 180/65.2

FOREIGN PATENT DOCUMENTS

U-57-189201  12/1982  Japan.

Primary Examiner—Josie Ballato
Attorney, Agent, or Firm—Oliff & Berridge, PLC

[57] ABSTRACT

A hybrid vehicle having a function for reducing the pumping loss. When the shift is in the reverse position, when an appliance is to be driven while the vehicle is in its stopped state and when the electric motor alone is able to drive the vehicle, the fuel supply to the internal combustion engine is cut off and one of the following is performed: the engine's throttle is widely opened; the engine is decompressing by opening the intake and exhaust valves; or the engine is decompressed by closing the intake valve while opening the exhaust valve. In such a manner, the pumping loss in the internal combustion engine can be reduced. Thus, the drag on the electric motor which would ordinarily be caused by stopping the internal combustion engine can be prevented without the provision of a one-way clutch or other equipment between the internal combustion engine and the electric motor.

12 Claims, 5 Drawing Sheets

HYBRID VEHICLE WITH PUMPING LOSS REDUCING FUNCTION

BACKGROUND OF THE INVENTION

1. Field of the Invention

The present invention relates to a hybrid vehicle capable of being driven by the mechanical output from at least one of an internal combustion engine and a dynamoelectric machine.

2. Description of the Prior Art

Electric vehicle (EV) systems which have both an internal combustion engine and a dynamoelectric machine (electric motor, electric generator are called hybrid vehicles (HVs). HVs can be classified as: series hybrid vehicles (SHV), parallel hybrid vehicles (PHV) or other vehicles. SHVs usually include an internal combustion engine, an electric generator, an electric motor, a capacitive component (which is generally a secondary battery) and other equipment. In SHVs, the generator is driven by the mechanical output of the internal combustion engine. Then the output of the generator is combined with the output of the on-vehicle battery to drive the on-vehicle electric motor, and the mechanical output of this motor drives the vehicle. PHVs usually include an internal combustion engine, a dynamoelectric machine, an accumulator (which is generally a battery or capacitor) and other equipment. PHVs are usually driven directly by the mechanical output of the internal combustion engine; however, when the vehicle must be accelerated or decelerated at a rate that cannot be accomplished by the internal combustion engine alone or if the drive efficiency of the engine would be degraded if only the internal combustion engine were used, the dynamoelectric machine, which is mechanically connected to the internal combustion engine, operates as an electric motor (on acceleration) or as an electric generator (on deceleration) to meet the required rate of acceleration or deceleration through the combined output of the internal combustion engine and the dynamoelectric machine.

These SHV and PHV are different from pure EV (PEV) in that since the battery or capacitor on the SHV or PHV is not always used to drive the electric motor or dynamoelectric machine, the frequency at which the on-vehicle battery or capacitor must be recharged by an external power source is lower than that of a PEV. In other words, the range per recharge can be extended.

SHV and PHV are also different from conventional internal combustion engine vehicles in that, in the SHV the internal combustion engine is not mechanically connected to the driving wheels and in the PHV, the dynamoelectric machine can provide rapid acceleration or deceleration. Fluctuation in the internal combustion engine's speed can be suppressed. Thus the SHV and PHV are more advantageous, from the viewpoint of fuel consumption and emission, than conventional vehicles.

Since the internal combustion engine can be used or not used, as desired, both the SHV and PHV can be low-noise, low-emission and low-fuel consumption vehicles, as in the PEV. For example, the SHV can be driven by only the discharged output of the on-vehicle accumulator even if the internal combustion engine is stopped and thus the generator is stopped, since the internal combustion engine is not mechanically connected to the driving wheels. Also, the PHV can be driven by only the dynamoelectric machine even if the internal combustion engine is stopped, since both the internal combustion engine and the dynamoelectric machine are mechanically connected to the driving wheels.

One problem in prior art PHVs is that the internal combustion engine functions as a drag when the vehicle is driven only by the dynamoelectric machine. However, this problem can be avoided by the use of a one-way clutch as described in Japanese Utility Model Laid-Open No. Sho 57-189201. It discloses an HV in which a one-way clutch is interposed between the internal combustion engine and the dynamoelectric machine such that power transmission from the dynamoelectric machine to the internal combustion engine can be voluntarily shut down. Thus, when the dynamoelectric machine is used as an electric motor and the internal combustion engine is stopped, the internal combustion engine will not be a drag on the dynamoelectric machine. However, the use of this one-way clutch leads to a complicated, large and expensive vehicle.

SUMMARY OF THE INVENTION

The first object of the present invention is to provide an HV in which the internal combustion engine will not cause any significant drag on the dynamoelectric machine when the dynamoelectric machine is used as an electric motor and the internal combustion engine is stopped. This object can be achieved by improving the engine control procedure. The second object of the present invention is to provide an HV which does not need a one-way clutch, so that it can be more easily constructed and be smaller and cheaper than the prior art. This object is also achieved when the first object is achieved.

The first aspect of the present invention provides a hybrid vehicle utilizing the mechanical output from at least one of an internal combustion engine and dynamoelectric machine, the improvements comprising: said internal combustion engine capable of being voluntarily stopped; said dynamoelectric machine mechanically connected to said internal combustion engine, said dynamoelectric machine capable of being operated at least as an electric motor; first control means for stopping said internal combustion engine while at the same time causing said dynamoelectric machine to be operated as an electric motor; and second control means for reducing any pumping loss in said internal combustion engine when said dynamoelectric machine is being operated as an electric motor with said internal combustion engine in a stopped state.

The second aspect of the present invention provides a controller in use of a hybrid vehicle utilizing the mechanical output from at least one of an internal combustion engine capable of being voluntarily stopped and a dynamoelectric machine mechanically connected to said internal combustion engine, said controller comprising: a first control means for stopping said internal combustion engine while at the same time causing said dynamoelectric machine to be operated as an electric motor; and a second control means for reducing any pumping loss in said internal combustion engine when said dynamoelectric machine is being operated as an electric motor with said internal combustion engine in a stopped state.

The third aspect of the present invention provides a control method in use of a hybrid vehicle utilizing the mechanical output from at least one of an internal combustion engine capable of being voluntarily stopped and a dynamoelectric machine mechanically connected to said internal combustion engine, said control method comprising: a first step of stopping said internal combustion engine while at the same time causing said dynamoelectric machine to be operated as an electric motor; and a second step of reducing any pumping loss in said internal combustion engine when said dynamoelectric machine is being operated as an electric motor and the said internal combustion engine is in a stopped state.

In the present invention, the pumping loss in the internal combustion engine is reduced when the internal combustion engine is in its stopped state and when the dynamoelectric machine mechanically connected to the internal combustion engine is being operated as an electric motor. As such, even though the internal combustion engine is mechanically connected to the dynamoelectric machine, there is no drag on the dynamoelectric machine when the internal combustion engine is stopped. Thus, battery consumption is reduced without the requirement of a one-way clutch or similar between the internal combustion engine and the dynamoelectric machine. As a result, the HV can be more easily constructed, smaller and cheaper than the prior art.

When the internal combustion engine is to be stopped, it is only necessary to cut off its fuel supply. Then to reduce the pumping loss in the internal combustion engine, one of the following procedures may be performed: a) widely open the throttle valve in the internal combustion engine using a throttle angle controlling mechanism to change the throttle angle, as necessary; b) use a valve controlling mechanism to decompress the intake and exhaust valves of the internal combustion engine when at their widely open state; or c) use a valve controlling mechanism so that the intake valve is fixed fully closed and the exhaust valve is fixed fully open.

The first and second steps provided as one feature of the present invention may be executed, for example, a) when the hybrid vehicle is stopped and the mechanical appliance of the dynamoelectric machine is to be driven; b) when the hybrid vehicle's drive system is reversed and the dynamoelectric machine is used to drive the vehicle; or c) when the power required by the hybrid vehicle can be provided only by the use of both the internal combustion engine and the dynamoelectric machine, operating as an electric motor.

In the above situation b), the first and second steps are executed while causing the dynamoelectric machine to operate as an electric motor. In the above situation c), the first and second steps are executed while causing the dynamoelectric machine to operate as an electric motor for outputting the required power. Note that, when the required power can be provided solely by the internal combustion engine, that engine may be controlled to produce the power; however, when the required power cannot be provided solely by the internal combustion engine, the internal combustion engine may be controlled while also causing the dynamoelectric machine to be operated as an electric motor, such that the dynamoelectric machine cooperates with the internal combustion engine to produce the required power.

In a system which comprises a capacitive device to supply electricity to or receive electricity from the dynamoelectric machine and in which the dynamoelectric machine can be used as an electric generator to recharge the capacitive device, the dynamoelectric machine may operate as an electric generator when it is necessary to recharge the capacitive device. The decision of whether or not the capacitive device is to be recharged may be carried out simultaneously with the decision of whether or not the required power can be provided by the dynamoelectric machine alone and will include the decision of what is to be the target of the mechanical output from the internal combustion engine.

DETAILED DESCRIPTION OF THE PREFERRED EMBODIMENTS

Figure 1:
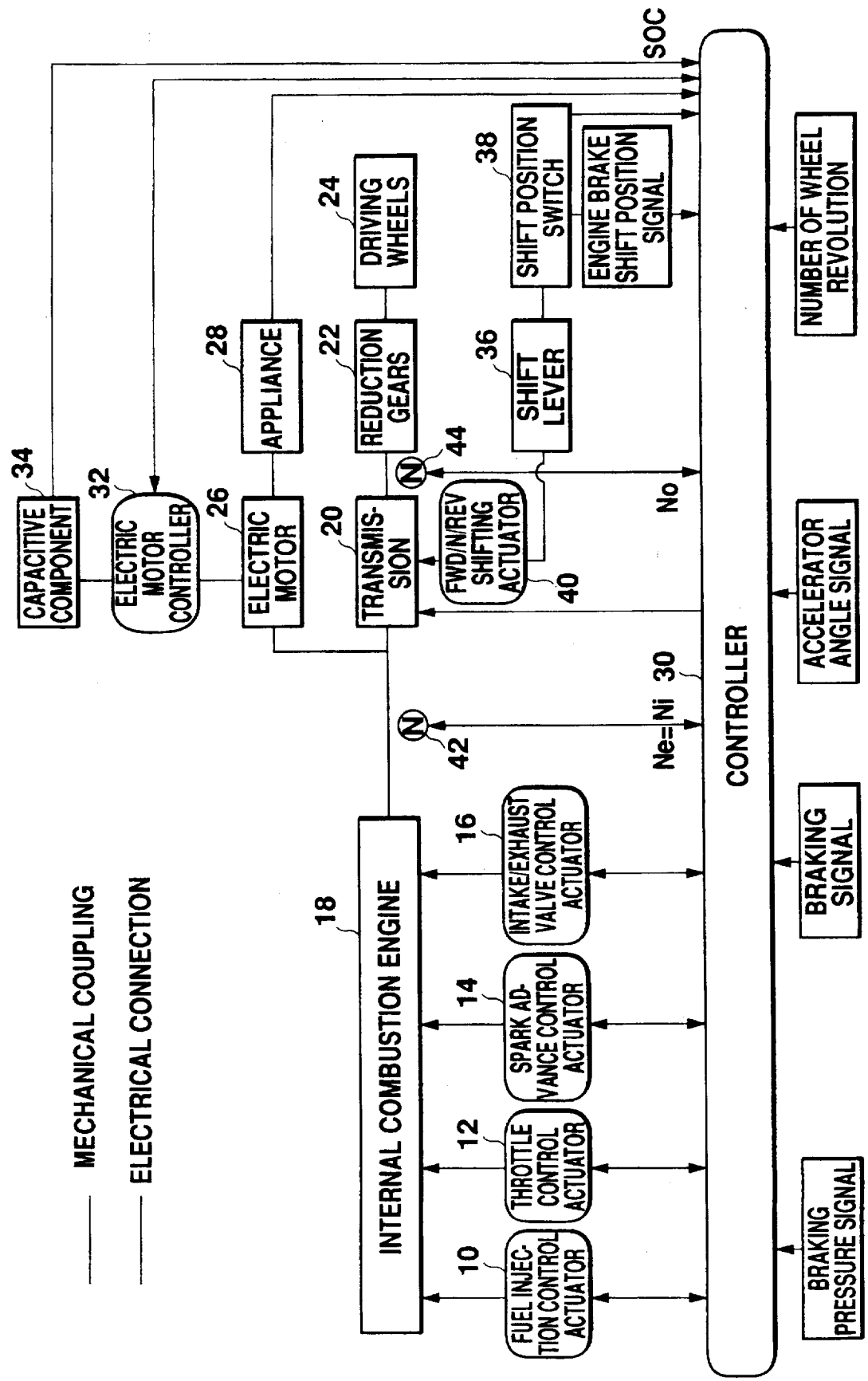
FIG. 1 is a block diagram of a PHV system in which the respective embodiments of the present invention can be used.

The preferred embodiments of the present invention will now be described with reference to the drawings. In the drawings similar parts are designated by similar reference numerals and will not be described further.

FIG. 1 shows a PHV system which is suitable for the present invention. The illustrated system comprises an internal combustion engine 18 provided with a fuel injection control actuator 10, a throttle angle control actuator 12, a spark advance control actuator 14 and an intake and exhaust valve control actuator 16. The internal combustion engine 18 is mechanically coupled, on one hand, to driving wheels 24 through a transmission 20 and reduction gears 22 and on the other hand, to an electric motor 26 and an on-vehicle mechanical appliance 28. In the illustrated system, therefore, the driving wheels 24 and the appliance 28 can be driven by either of the internal combustion engine 18 or the electric motor 26. The electric motor 26 is capable of operating as both of a motor and a generator. When the electric motor 26 operates as an electric motor while the internal combustion engine 18 is stopped a controller 30 performs control procedure that is described later to reduce any pumping loss and prevent the internal combustion engine 18 from being a drag on the electric motor 26.

The illustrated system is controlled by the controller 30. For example, when the vehicle operator depresses an acceleration or brake pedal it generates an accelerator angle signal indicating the accelerator angle or a braking signal indicating the brake pressure, and the controller 30 determines the torque to be output from the engine 18 and motor 26, by using these accelerator angle or brake pressure signals as well as other variables such as the revolving speed of the driving wheels 24. The controller 30 then generates and sends control signals representing the required output torque to the internal combustion engine 18 (more particularly, to various types of actuators therein) and an electric motor controller 32. The electric motor controller 32 functions as a means for controlling the mechanical output of the electric motor 26. The controlling means may be provided, for example, by an inverter if the electric motor 26 is AC motor. The mechanical outputs of both the internal combustion engine 18 and electric motor 26 are thus controlled by such control signals.

The controller 30 also detects the state of charge (SOC) in the capacitive component (secondary battery or capacitor) 34 and changes the value of the control signal, so as to maintain the charge in the capacitive component 34 within an optimum range to extend the life thereof. More particularly, the controller 30 can provide a control signal such that the motor controller 32 will operate the electric motor 26 as an electric generator and value of such signal will represent the control target of the generator output, when the SOC is equal to or lower than the lower limit. On the contrary, the controller 30 may cause the capacitive device 34 to be discharged by changing motor-mode operation and by controlling the motor-output. Thus, the SOC of the capacitive device 34 which is the electric power source for the electric motor 26 can be maintained within a given target range.

The controller 30 further detects the position of a shift lever 36, that is manipulated by the vehicle operator, through a shift position switch 38. The transmission 20 is driven by an actuator 40 depending on the manipulation of the shift lever 36. The controller 30 further uses revolution sensors 42 and 44 to detect the revolving speed $N_e$ of the internal combustion engine 18 (and thus the revolving speed $N_i$ of the transmission 20 at the input side thereof) and the revolving speed $N_o$ of the transmission 20 at the output side thereof, with reference to which the controller 30 controls the internal combustion engine 18, electric motor 26, transmission 20 and so on. The controller 30 further uses the engine brake shift position signal from the shift position switch 38 which represents the shift lever position when the shift lever 36 is within the engine brake range.

Figure 2:
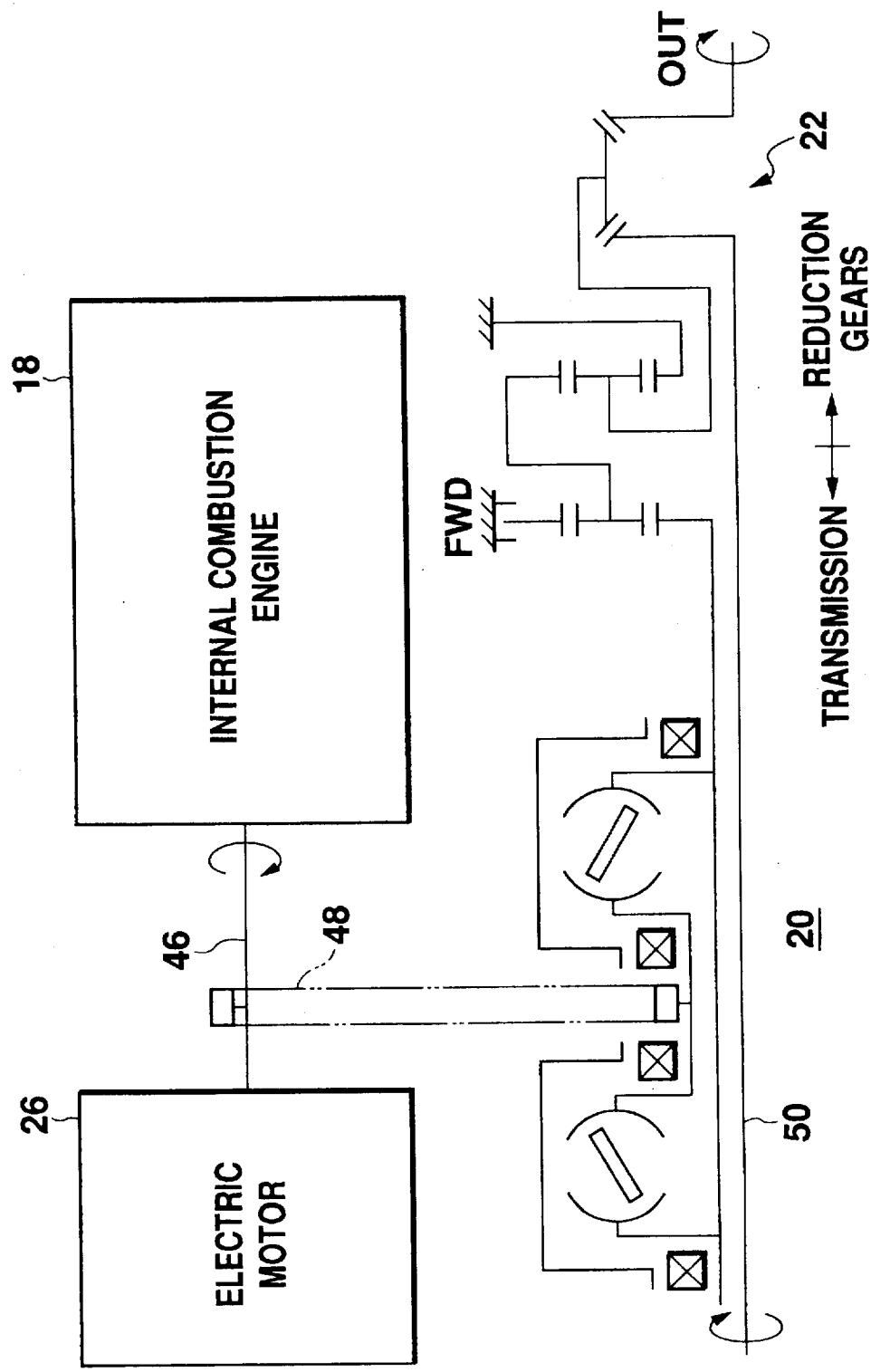
FIG. 2 illustrates a transmission in which the reverse (REV) stage has been omitted.

FIG. 2 shows the structure of the transmission 20 in this embodiment. In this figure, a shaft 46 connecting the internal combustion engine 18 to the electric motor 26 is mechanically coupled to a shaft 50 on the transmission 20 side through a power transmitting member 48. The illustrated transmission 20 is in the form of a continuously variable transmission (CVT). However, the transmission 20 has no reverse gear. In this embodiment, such a transmission 20 can be used because if the shift lever 36 is shifted to reverse (REV), the controller 30 controls the electric motor 26 to rotate in the reverse direction.

Figure 3:
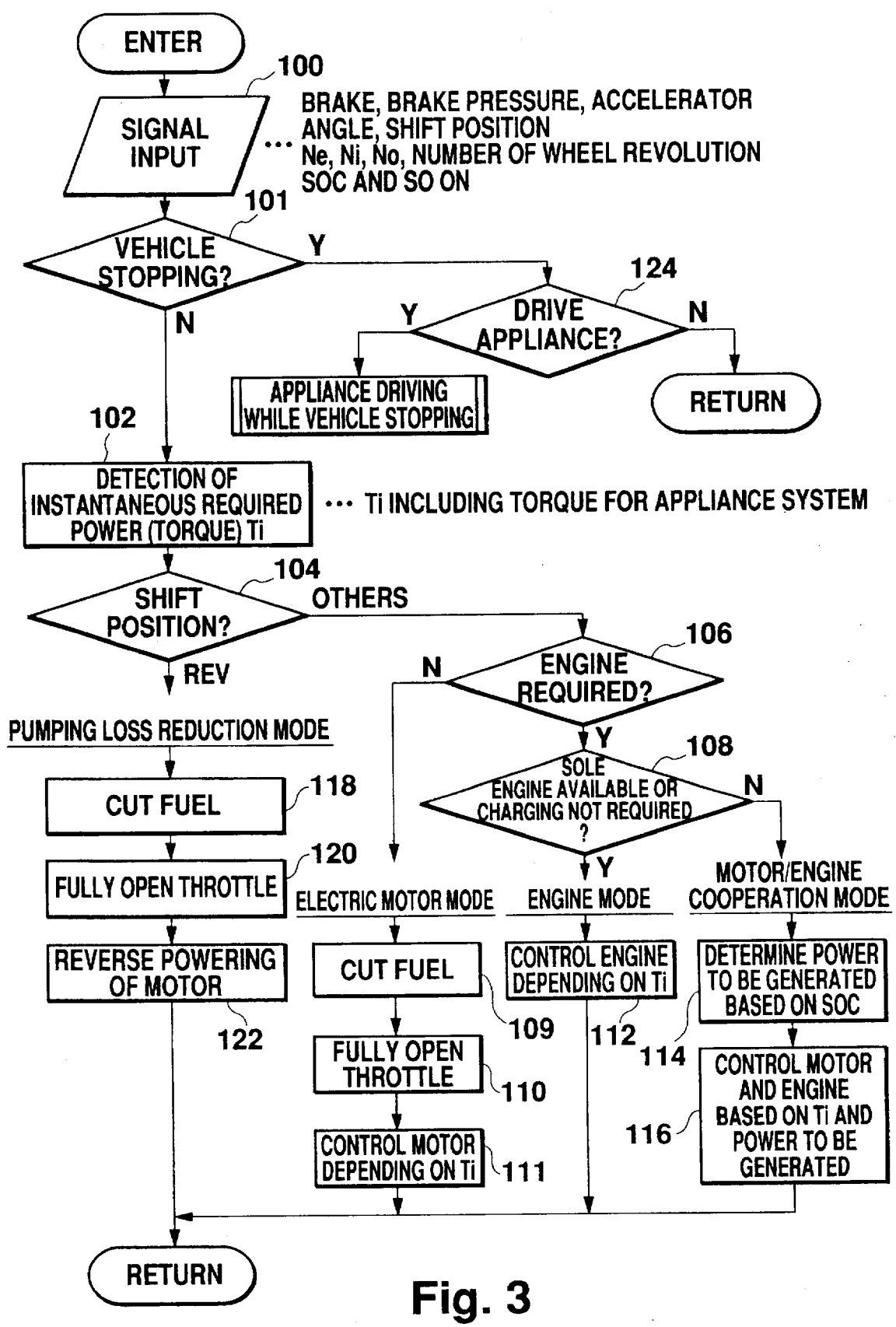
FIGS. 3 and 4 are flow charts illustrating the operation of the controller in the first embodiment of the present invention.

FIG. 3 shows one procedure for controlling the driving mode in the vehicle among various procedures which will be executed by the controller 30 in this embodiment. The illustrated procedure will be repeated with a given frequency.

The controller 30 first receives signals from the respective parts of the vehicle when the driving mode is to be controlled by the controller 30 (100). These input signals include braking signal, brake pressure signal, accelerator angle signal, shift position, $N_e$, $N_i$, $N_o$, revolving speed of the wheels, SOC and others, as described. If it is determined from these input signals that the vehicle is not in its stopped state (101), the controller 30 computes the instantaneous required torque $T_i$ based on these input signals (102). More particularly, the controller 30 detects the acceleration or deceleration torque that is now required by the vehicle operator, based on the accelerator angle signal and the brake pressure signal. Since the system shown in FIG. 1 includes appliances 28 mechanically driven by the internal combustion engine 18 and electric motor 26, a term regarding the state of the appliance 28 must also be included in the logic for determining the required torque $T_i$. If the appliance 28 is, for example, in the form of an alternator, the voltage and the like of another battery for supplying power to other not-shown electric appliances and charged by this alternator will be referred to. Note that in this embodiment, the appliances 28 which can be driven by the internal combustion engine 18 and electric motor 26 are not limited to such a type of appliance. Further, in place of torque control, power control may also be carried out.

The controller 30 then determines the shift position (104). If the shift position is in any other than the REV position, the controller 30 further determines whether or not the internal combustion engine 18 is necessary to realize the instantaneous required power $T_i$ (106) and whether or not the capacitive component 34 should be charged, i.e., whether the SOC is below its threshold (108).

If it is judged that the instantaneous required torque $T_i$ can be attained by only the electric motor 26, the controller 30 shifts to electric motor mode wherein a control signal is generated on the basis of the instantaneous required torque $T_i$ and is sent to the motor controller 32 which adjusts the electric motor 26 for the instantaneous required torque $T_i$ (111). In this way, if the acceleration or deceleration required is relatively small, it can be provided by the electric motor 26. At the same time as the controller 30 enters electric motor mode, steps 109 and 110 are executed to prevent or reduce the drag caused by the internal combustion engine 18. More particularly, the controller 30 cuts off the fuel supply to the internal combustion engine 18 through the fuel injection control actuator 10 and other actuators (109), and the internal combustion engine 18 will stop. In addition, the controller 30 fully opens the throttle in the internal combustion engine 18 through the throttle angle control actuator 12 and other actuators (110), thereby lowering the pumping loss.

On the contrary, if it is determined that the instantaneous required torque $T_i$ cannot be attained unless the mechanical output of the internal combustion engine 18 is increased or decreased (106), the controller then determines (a) if the internal combustion engine alone can provide the instantaneous required torque and (b) if the capacitive component 34 is within its optimal charge range. If both (a) and (b) are true the controller enters internal combustion engine mode. In the internal combustion engine mode, the controller 30 controls the revolving speed $N_e$ and others in the internal combustion engine 18 depending on the instantaneous required torque $T_i$ (112). In this way, if the acceleration or deceleration is relatively large, it can be provided by the engine 18.

If either (a) or (b) above are false (108), that is, either the internal combustion engine 18 alone cannot provide the instantaneous required torque, or the capacitive component 34 is outside its optimal charge range, the controller enters motor/engine cooperation mode. In this mode, the controller 30 first determines the power, based on the SOC, required to recharge the capacitive component 34 (114) and then cooperatively controls the electric motor 26 and internal combustion engine 18 based on the total instantaneous required torque $T_i$ to provide both the necessary acceleration or deceleration and charging power (116). Thus, the SOC of the capacitive component 34 can be maintained within the target range while meeting the requirement of acceleration or deceleration. In other words, part of the mechanical output of the internal combustion engine 18 can be converted into electric energy to be stored in the capacitive component 34 by the electric motor 26 while the internal combustion engine 18 is also driving the driving wheels 24 to attain the required acceleration or deceleration (and, if necessary, providing the appliance 28 with its required power).

If it is determined that the shift position is REV at the aforementioned step 104, the controller will shift to pumping loss reduction mode. In pumping loss reduction mode, the controller 30 executes steps 118 and 120 which are similar to steps 109 and 110 and also provides a control signal to the motor controller 32. This control signal causes the electric motor 26 to be reversed and provide the instantaneous required torque $T_i$ (122).

Figure 4:
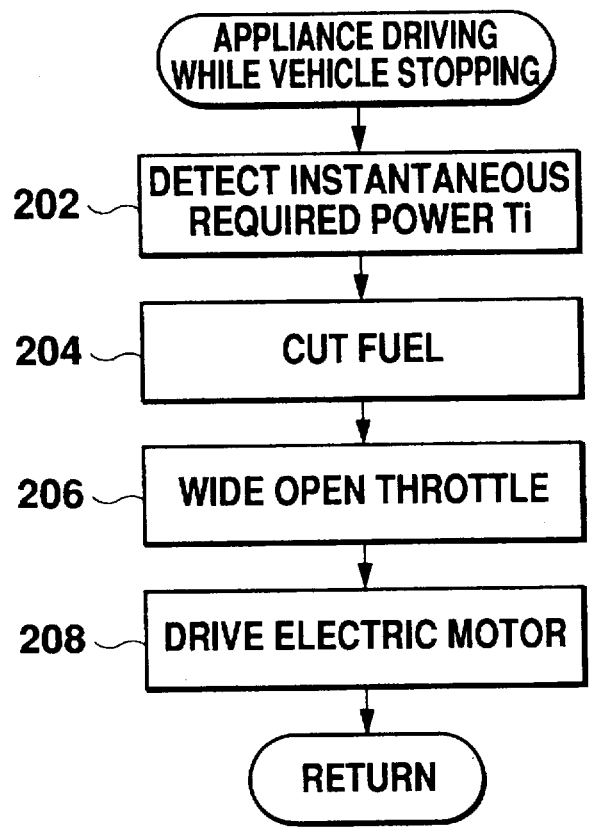

FIG. 4 shows one possible procedure to be performed by the controller 30 when it determines that the vehicle is stopped (101) but that an appliance 28 is to be powered (124), that is, a vehicle stopped/appliance power procedure. If the appliance 28 is to be powered by the electric motor 26 when the vehicle, and thus its internal combustion engine 18, is stopped, the controller 30 determines the instantaneous required torque $T_i$ based on the state of the appliance 28 and others (202). In addition, the controller 30 cuts off the fuel supply to the internal combustion engine 18 (204), shifts the throttle to its fully open position (206) and causes the electric motor 26 to provide the instantaneous required torque $T_i$ (208).

In this embodiment, the internal combustion engine 18 is first stopped and only the electric motor 26 is used to reverse the vehicle. Therefore, as shown in FIG. 2, the transmission 20 does not require any reverse gear. Whenever only the electric motor 26 is to be used, that is when the vehicle is to be reversed, when the vehicle is to be driven forward solely by the electric motor 26, or when the appliance 28 is to be powered when the vehicle is stopped, the fuel supply to the internal combustion engine 18 can be cut off and its throttle can be fully opened to forcedly reduce the pumping loss in the internal combustion engine 18. Therefore, the internal combustion engine 18 will not be a drag on the electric motor 26 even though the transmission 20 is mechanically connected to the electric motor 26 without interposition of any clutch or the like. Consequently, the PHV can be more easily constructed and be reduced in size and cost compared with a PHV with a one-way clutch or similar, thereby further improving fuel economy.

Figure 5:
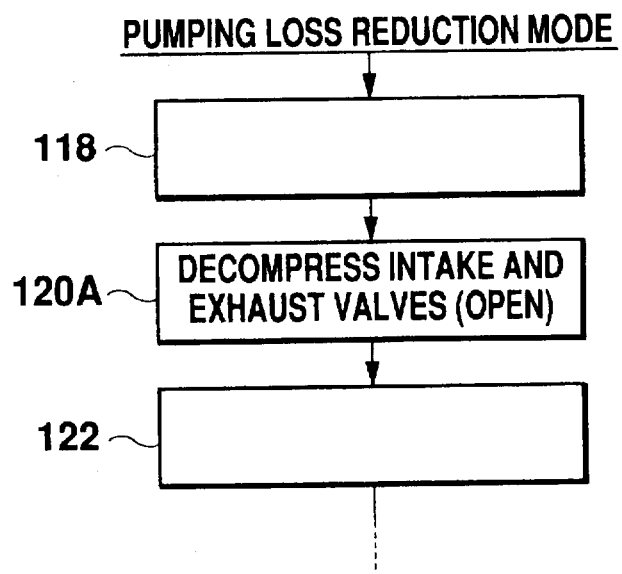
FIGS. 5 and 6 are flow charts illustrating the operation of the controllers in the second and third embodiments of the present invention.

FIG. 5 shows a procedure executed by the controller 30 in a PHV relating to the second embodiment of the present invention and particularly a procedure for controlling the pumping loss reduction mode. Since the second embodiment can be accomplished using the same system as shown in FIG. 1, the details of the system are not repeated. Also, since most of the control procedure in the second embodiment is common to that in FIG. 3, only the differences between the procedures in FIGS. 5 and 3 will be described below.

In the second embodiment, the controller 30 cuts off the fuel supply to the internal combustion engine 18 (118) and then controls the intake/exhaust valve control actuator 16 to lock the intake and exhaust valves of the internal combustion engine 18 in their fully open state (decompression: 120A). Through this procedure, the pumping loss in the internal combustion engine 18 can be reduced as the first embodiment. Thus, the second embodiment can provide the same advantages as the first embodiment.

Figure 6:
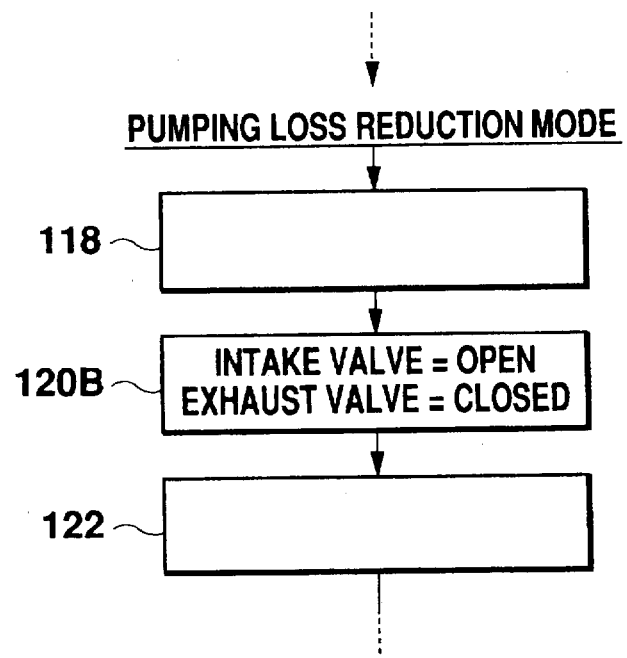

FIG. 6 particularly shows the primary parts of a procedure of controlling the driving mode through the controller 30 in a PHV relating to the third embodiment of the present invention. Since the third embodiment can be accomplished using the same system as shown in FIG. 1, the details of the system are not repeated. Also, since most of the control procedure in the third embodiment is common to that in FIG. 3, only the differences between the procedures in FIG. 6 and 3 will be described below.

In the third embodiment, the controller 30 cuts off the fuel supply to the internal combustion engine 18 (118) and then locks the intake valve in its closed state and the exhaust valve in its open state (120B). Thus, no or very little fresh air can flow into the catalyst of the internal combustion engine 18. As a result, the pumping loss in the internal combustion engine 18 will be similarly reduced. Therefore, the third embodiment can provide the same advantages as the first and second embodiments.

Step 206 in the first embodiment can also be replaced by step 120A or 120B shown in FIGS. 5 and 6. The reduction of pumping loss according to the present invention can also be applied to other situations than those in the previously described embodiments. Although the above description does not refer to the principle and structure of the internal combustion engine 18, the latter may be either of a gasoline or a diesel engine. If the internal combustion engine 18 is a diesel engine, its air shutter may be controlled in place of the throttle and be fully opened as required. Since the pumping loss can be similarly reduced by controlling the exhaust gas recirculation (EGR), this may also be controlled in place of steps 120, 120A and 120B.

Although the embodiments have been described with regard to a PHV, the present invention may be similarly applied to SHVs. More particularly, SHVs also include an internal combustion engine and an electric generator (which is a kind of dynamoelectric machine) that is mechanically connected to the internal combustion engine. In the systems, when an on-vehicle appliance which is mechanically connected to the internal combustion engine is to be powered when the internal combustion engine is stopped, the electric generator can operate as an electric motor. If the method of the present invention, that is, the method of controlling and reducing the pumping loss in the internal combustion engine is applied to SHVs to prevent the internal combustion engine from providing the drag to the dynamoelectric machine, the same advantages can be accomplished without requiring a clutch.

What is claimed is:

1. A hybrid vehicle utilizing the mechanical output from at least one of an internal combustion engine and a dynamoelectric machine, comprising:

said internal combustion engine capable of being voluntarily stopped;

said dynamoelectric machine mechanically connected to said internal combustion engine, said dynamoelectric machine capable of being operated at least as an electric motor;

first control means for stopping said internal combustion engine while at the same time causing said dynamoelectric machine to be operated as an electric motor; and second control means for reducing the pumping loss in said internal combustion engine when said dynamoelectric machine is being operated as an electric motor with said internal combustion engine being in its stopped state.

2. A hybrid vehicle as defined in claim 1 wherein said first control means includes a means for cut off the fuel supply to said internal combustion engine to stop said internal combustion engine.

3. A hybrid vehicle as defined in claim 1 wherein said internal combustion engine includes a throttle angle controlling mechanism for changing the throttle angle in said internal combustion engine and wherein said second control means includes means for making the throttle angle widely open by operating said throttle angle controlling mechanism to reduce the pumping loss in said internal combustion engine.

4. A hybrid vehicle as defined in claim 1 wherein said internal combustion engine includes a valve controlling mechanism for controlling at least one of the fresh air intake and exhaust gas valves in said internal combustion engine and wherein said second control means includes a means for locking the valves widely open, thereby reducing the pumping loss in said internal combustion engine.

5. A hybrid vehicle as defined in claim 1 wherein said internal combustion engine includes a valve controlling mechanism for controlling both the fresh air intake and exhaust gas valves in said internal combustion engine and wherein said second control means includes a means for locking said valve controlling mechanism to shut down the intake of fresh air and to allow the release of the exhaust gas, thereby reducing the pumping loss in said internal combustion engine.

6. A controller in use of a hybrid vehicle utilizing the mechanical output from at least one of an internal combustion engine capable of being voluntarily stopped and a dynamoelectric machine mechanically connected to said internal combustion engine, said controller comprising:

first control means for stopping said internal combustion engine while at the same time causing said dynamoelectric machine to be operated as an electric motor; and second control means for reducing the pumping loss in said internal combustion engine when said dynamoelectric machine is being operated as an electric motor with said internal combustion engine being in its stopped state.

7. A control method in use of a hybrid vehicle utilizing the mechanical output from at least one of an internal combustion engine capable of being voluntarily stopped and a dynamoelectric machine mechanically connected to said internal combustion engine, said control method comprising:

a first step of stopping said internal combustion engine while at the same time causing said dynamoelectric machine to be operated as an electric motor; and a second step of reducing the pumping loss in said internal combustion engine when said dynamoelectric machine is being operated as an electric motor and the said internal combustion engine is in its stopped state.

8. A control method as defined in claim 7, further comprising a step for executing said first and second steps when said hybrid vehicle is in its stopped state and a mechanical appliance attached to said dynamoelectric machine is to be powered.

9. A control method as defined in claim 7 wherein said dynamoelectric machine is used to drive said hybrid vehicle and wherein said control method further comprises a step in which said first and second steps are executed when said hybrid vehicle is to be reversed and also of causing said dynamoelectric machine to operate as an electric motor for reversing said hybrid vehicle.

10. A control method as defined in claim 7 wherein said internal combustion engine and said dynamoelectric machine being operating as an electric motor produce the power for driving said hybrid vehicle, and said control method further comprising the steps of:

when said required power can be provided by said dynamoelectric machine alone, executing said first and second steps, while at the same time causing said dynamoelectric machine to be operated as an electric motor such that said required power can be produced by said dynamoelectric machine alone;

when said required power can be provided by said internal combustion engine alone controlling said internal combustion engine to produce said required power; and when said required power can only be provided by both of said dynamoelectric machine and internal combustion engine, controlling said internal combustion engine while causing said dynamoelectric machine to be operated as an electric motor such that said dynamoelectric machine can cooperate with said internal combustion engine to produce said required power.

11. A control method as defined in claim 7 wherein said hybrid vehicle comprises a capacitive device for supplying electricity to and receiving electricity from said dynamoelectric machine, said dynamoelectric machine being also operable as an electric generator for charging said capacitive device, said control method further comprising a step of causing said dynamoelectric machine to be operated as an electric generator when said capacitive device should be charged.

12. A control method as defined in claim 11 wherein when said capacitive device should be charged, said dynamoelectric machine is operated as an electric generator and the internal combustion engine is controlled to output the mechanical power required to both drive the hybrid vehicle and to charge said capacitive device.

* * * * *